2,937,150

METHOD OF PREPARING THREE-COLOR ELECTROLUMINESCENT PHOSPHOR

Willi Lehmann, Livingston, N.J., assignor to Westinghouse Electric Corporation, East Pittsburgh, Pa., a corporation of Pennsylvania No Drawing. Application December 24, 1956
Serial No. 630,040

5 Claims. (Cl. 252—301.6)

This invention relates to electroluminescent phosphors and, more particularly, to the method of preparing a zinc-sulfide electroluminescent phosphor which is activated by copper and manganese and coactivated with a halogen, and which phosphor electroluminesces in three individual colors.

Electroluminescence was first completely disclosed by G. Destriau in London, Edinburgh and Dublin Philosophical Magazine, Series 7, volume 38, No. 285, pages 700–737 (October 1947), article titled "The New Phenomenon of Electrophotoluminescence." In this now well known phenomenon, selected phosphor materials are placed within the influence of an electric field, such as by sandwiching the phosphor material between two spaced electrodes and applying an alternating potential between these electrodes. The resulting electric field which is created between the electrodes excites the "field-responsive" phosphor material to luminescence. Electroluminescent cells which will display two colors when excited by different electric-field frequencies are known and are described in copending application of Willi Lehmann, the inventor herein, S.N. 630,355, filed concurrently herewith, titled "Electroluminescent Cell," and owned by the present assignee.

For some applications, it is desirable to provide electroluminescent cells which will display three individual colors. This can be achieved by superimposing individual cells as disclosed in Patent No. 2,730,644 to Michlin, wherein each individual superimposed layer may be energized separately to electroluminesce in a different color. There are many applications, however, where the "individual-color-producing" electroluminescent material cannot be used in separate layers and still desirably electroluminesces in three different colors. One such application is described in copending application of Henry F. Ivey, S.N. 630,356, filed concurrently herewith, titled "Electroluminescent Device," and owned by the present assignee.

It is the general object of this invention to provide a method for making an electroluminescent phosphor which can be energized to three individual colors when excited by individual electric fields of divergent frequencies.

It is a further object to provide optimum and permissible constituent ranges for preparing the three-color electroluminescent phosphor.

The aforesaid objects of the invention, and other objects which will become apparent as the description proceeds, are achieved by providing a method for preparing a three-color, field-responsive phosphor comprising zinc sulfide activated by copper and manganese and coactivated by a halogen. The phosphor raw-mix constituents are fired and after firing, the phosphor is alternately exposed to weak and strong 3650 A.U. excitation. Under the weak 3650 A.U. excitation, the yellow-luminescing portions are separated and under the strong 3650 A.U. excitation, the blue-green luminescing portions are separated. The order of exposure to the weak and strong 3650 A.U. excitation may be reversed, if desired. The separated phosphor portions which display both yellow luminescence under the weak 3650 A.U. excitation and blue-green luminescence under the strong 3650 A.U. excitation will display three individual colors when excited by individual electric fields of divergent frequencies.

The three-color electroluminescent phosphor is prepared by admixing zinc sulfide and copper-containing compound and a chloride, bromide or iodide, or mixtures thereof. The primary constituent of the phosphor is zinc sulfide, although small amounts of zinc oxide may be present. The amount of copper in the admixture should be such that there is from 0.001 to 0.005 gram-atom of copper per mole of zinc sulfide and the preferred amount of copper is about 0.003 gram-atom per mole of zinc sulfide. The manganese should be present in amounts sufficient to provide from 0.009 to 0.013 gram-atom of manganese per mole of zinc sulfide and the preferred amount of manganese is about 0.01 gram-atom per mole of zinc sulfide. The chloride, bromide or iodide, or mixtures thereof, should be present in amounts sufficient to provide from 0.006 to 0.04 gram-atom per mole of zinc sulfide and preferably there should be about 0.02 gram-atom of the specified halide per mole of zinc sulfide.

The aforegoing raw-mix components may be fired at a temperature of from 800° C. to 1300° C. for at least about 15 minutes, the higher the firing temperature the shorter the firing time. As a specific example, the phosphor may be fired at 1100° C. for one hour in an atmosphere comprising sulphur vapor. The best results have been obtained with a firing atmosphere comprising sulphur vapor as is disclosed in copending application of Willi Lehmann, the inventor herein, S.N. 630,354, filed concurrently herewith, titled "Phosphor," and owned by the present assignee. Other firing atmospheres may be used, however, with good results such as hydrogen sulfide, sulphur dioxide, nitrogen or noble gas. Under all of these firing-atmosphere conditions, the presence of oxygen should be minimized as much as possible.

Following is an example for preparing the three-color electroluminescent phosphor.

*Example 1*

| Phosphor Constituent | Preferred Amount, mole | Permissible Amount, mole |
|---|---|---|
| Zinc Sulfide | 1 | 1 |
| Manganous Acetate | 0.01 | 0.009 to 0.013 |
| Copper Sulphate | 0.003 | 0.001 to 0.005 |
| Zinc Chloride | 0.01 | 0.003 to 0.02 |

NOTE.—Copper nitrate, copper bromide, copper iodide, copper chloride, or mixtures thereof such as equal parts of the chloride and iodide, for example, may be substituted for the copper sulphate. The halogen which is not supplied by the copper-containing compound, for example, may be supplied by potassium, sodium or zinc bromides, iodides or chlorides, or mixtures thereof such as equal parts of sodium bromide and chloride, for example. The manganese may be supplied as a bromide, iodide or chloride or mixtures thereof such as equal parts of the bromide and iodide, for example, or by other manganese-containing compound. The halides of those compounds which poison the output of the phosphor, such as iron cobalt, nickel or chromium halides, should be avoided.

It can thus be seen that the foregoing phosphor is zinc sulfide, activated by copper and manganese and coactivated by a specified halogen. Such phosphors are generally known in the art and are described in Patents No. 2,743,238 and 2,743,239, for example. A somewhat similar phosphor is also described in Patent No. 2,470,451 to Wood. None of these zinc sulfide, copper- and manganese-activated phosphors will display three-color electroluminescence, although Patent No. 2,743,238 does disclose a phosphor system wherein the individual colors of individual phosphors can be varied by changing the activator concentrations. In order to make the phosphor of Example I three-color-responding in nature, it is necessary to expose the fired phosphor to relatively-weak 3650 A.U. excitation. This will cause portions of the fired phosphor to luminesce with a yellow color and these yellow-luminescing phosphor portions are separated from the phosphor residuum. The portions of the phosphor which luminesced yellow under relatively-weak 3650 A.U. excitation are then re-exposed to relatively-strong 3650 A.U. excitation. This will cause portions of the separated phosphor to luminesce with a blue-green color. These blue-green-luminescing phosphor portions are then separated from the phosphor residuum. The order of exposure may be reversed, if desired. That is, the phosphor may first be exposed to strong 3650 A.U. and then to weak 3650 A.U. The separated phosphor portions which display both yellow luminescence under weak 3650 A.U. excitation and blue-green luminescence under strong 3650 A.U. excitation will display three individual colors when excited by electric fields of divergent frequencies. If the respective yellow and blue-green luminescing portions of the phosphor were not separated from the residua, the resulting admixture would display a yellow to bluish electroluminescent response, depending on the activator concentrations, and would not be three-color responsive.

In exciting the fired phosphor with the so-called "relatively-strong" 3650 A.U. excitation, the phosphor may be placed about ten cm. from a 100 watt ultraviolet lamp having a reflector five inches in diameter. This produces an ultraviolet intensity in the order of 0.1 watt per cm.$^2$, which is a relatively-strong ultraviolet intensity. In exciting the fired phosphor with the so-called "relatively-weak" 3650 A.U. excitation, the phosphor is placed about one and one-half meters from the 100 watt ultraviolet lamp. This produces an ultraviolet intensity in the order of 1 milliwatt per cm.$^2$, which is a relatively-weak ultraviolet intensity.

The foregoing three-color phosphor may be incorporated into an electroluminescent cell by the usual methods such as suspending the phosphor either in a solid dielectric material or in a suitable liquid dielectric such as castor oil. The spacing between electrodes bounding the dielectric is not critical, but may be 50 microns, for example. Under field-excitation frequencies of about 60 to 360 cycles per second, for example, the phosphor will respond in the yellow region of the visible spectrum. When the field-excitation frequency is increased to about 1 kc. per second, the phosphor will respond in the green region of the visible spectrum and when the field-excitation frequency is increased to about 15 to 30 kcs. per second, the phosphor will respond in the blue region of the visible spectrum. These field-excitation frequencies may be varied somewhat. Normally, however, the more divergent the frequencies, the sharper the color distinction. These colors are sharply defined and if it is desired to alter the colors produced by the phosphor, suitable filters may be used in front of the cell. For example, if it is desired to produce a red-green-blue phosphor, an interference filter which cuts off from about 5700 to about 6100 A.U., may be placed in front of the cell. The phosphor, when electroluminescing in the yellow portion of the visible spectrum, has considerable red radiations and if a filter, as noted hereinbefore, is placed in front of the phosphor, the then-unwanted yellow radiations will be cut out, leaving only the red radiations. Thus the phosphor will produce red, green and blue, which constitute the usual primary-color components as are used in color television, for example.

It will be recognized that the objects of the invention have been achieved by providing a method for making a three-color electroluminescent phosphor and by providing permissible and optimum constituent ranges for preparing this phosphor.

While in accordance with the patent statutes, one best-known embodiment of the invention has been illustrated and described in detail, it is to be particularly understood that the invention is not limited thereto or thereby.

I claim:

1. The method of preparing a three-color field-responsive phosphor comprising zinc sulfide activated by copper and manganese and coactivated by at least one of the group consisting of chlorine, bromine and iodine: comprising admixing zinc sulfide and copper-containing compound and halide of at least one of the group consisting of chloride, bromide and iodide, and excluding the halides of the group consisting of iron, cobalt, nickel and chromium halides; said admixture containing from 0.001 to 0.005 gram-atom of copper per mole of zinc sulfide, from 0.009 to 0.013 gram-atom of manganese per mole of zinc sulfide, and from 0.006 to 0.04 gram atom of at least one of the group consisting of chlorine, bromine and iodine per mole of zinc sulfide; firing said admixture at a temperature of from 800° C. to 1300° C. for at least about 15 minutes in an atmosphere which is substantially free from oxygen; alternately exposing said fired phosphor to relatively weak and to relatively strong 3650 A.U. excitations, some of said fired phosphor displaying a yellow luminescence when exposed to said relatively weak 3650 A.U. excitation, some of said fired phosphor displaying a blue-green luminescence when exposed to said relatively strong 3650 A.U. excitation; and separating that part of said fired phosphor which displays both yellow luminescence under said relatively-weak 3650 A.U. excitation and blue-green luminescence under said relatively-strong 3650 A.U. excitation from the phosphor residuum; whereby the separated phosphor which displays both said yellow and said blue-green luminescence will display three individual colors when excited by electric fields of divergent frequencies.

2. The method of preparing a three-color field-responsive phosphor comprising zinc sulfide activated by copper and manganese and coactivated by at least one of the group consisting of chlorine, bromine and iodine: comprising admixing zinc sulfide and copper-containing compound and halide of at least one of the group consisting of chloride, bromide and iodide, and excluding the halides of the group consisting of iron, cobalt, nickel and chromium halides; said admixture containing about 0.003 gram-atom of copper per mole of zinc sulfide, about 0.01 gram-atom of manganese per mole of zinc sulfide, and about 0.02 gram-atom of at least one of the group consisting of chlorine, bromine and iodine per mole of zinc sulfide; firing said admixture at a temperature of from 800° C. to 1300° C. for at least about 15 minutes in an atmosphere which is substantially free from oxygen; alternately exposing said fired phosphor to relatively weak and to relatively strong 3650 A.U. excitations, some of said fired phosphor displaying a yellow luminescence when exposed to said relatively weak 3650 A.U. excitation, some of said fired phosphor displaying a blue-green luminescence when exposed to said relatively strong 3650 A.U. excitation; and separating that part of said fired phosphor which displays both yellow luminescence under said relatively-weak 3650 A.U. excitation and blue-green luminescence under said relatively-strong 3650 A.U. excitation from the phosphor residuum; whereby the separated phosphor which displays both said yellow and said blue-green luminescence will display three individual colors when excited by electric fields of divergent frequencies.

3. The method of preparing a three-color field-responsive phosphor comprising zinc sulfide activated by copper and manganese and coactivated by at least one of the group consisting of chlorine, bromine and iodine: comprising admixing zinc sulfide and copper-containing compound and halide of at least one of the group consisting of chloride, bromide and iodide, and excluding the halides of the group consisting of iron, cobalt, nickel and chromium halides; said admixture containing from 0.001 to 0.005 gram-atom of copper per mole of zinc sulfide, from 0.009 to 0.013 gram-atom of manganese per mole of zinc sulfide, and from 0.006 to 0.04 gram atom of at least one of the group consisting of chlorine, bromine and iodine per mole of zinc sulfide; firing said admixture at a temperature of from 800° C. to 1300° C. for at least about 15 minutes in an atmosphere which is substantially free from oxygen; exposing said fired phosphor to relatively weak 3650 A.U. excitation to cause a portion of said fired phosphor to display a yellow luminescence; physically separating said yellow-luminescing phosphor portion from the non-yellow-luminescing phosphor residuuum; exposing said separated yellow luminescing phosphor portion to relatively strong 3650 A.U. excitation to cause a part of said separated phosphor portion to display a blue-green luminescence; and physically separating said blue-green luminescing phosphor part from the non-blue-green-luminescing phosphor residuum; whereby the separated phosphor material which displays both said yellow and said blue-green luminescence will display three individual colors when excited by electric fields of divergent frequencies.

4. The method of preparing a three-color field-responsive phosphor comprising zinc sulfide activated by copper and manganese and coactivated by at least of one the group consisting of chlorine, bromine and iodine; comprising admixing zinc sulfide and copper-containing compound and halide of at least one of the group consisting of chloride, bromide and iodide, and excluding the halides of the group consisting of iron, cobalt, nickel and chromium halides; said admixture containing from 0.001 to 0.005 gram-atom of copper per mole of zinc sulfide, from 0.009 to 0.013 gram-atom of manganese per mole of zinc sulfide, and from 0.006 to 0.04 gram atom of at least one of the group consisting of chlorine, bromine and iodine per mole of zinc sulfide; firing said admixture at a temperature of from 800° C. to 1300° C. for at least about 15 minutes in an atmosphere which is substantially free from oxygen; exposing said fired phosphor to relatively strong 3650 A.U. excitation to cause a portion of said fired phosphor to display a blue-green luminescence; physically separating said blue-green-luminescing phosphor portion from the non-blue-green-luminescing phosphor residuum; exposing said separated blue-green luminescing phosphor portion to relatively weak 3650 A.U. excitation to cause a part of said separated phosphor portion to display a yellow luminescence; and physically separating said yellow-luminescing phosphor part from the non-yellow-luminescing phosphor residuum; whereby the phosphor which displays both said blue-green and said yellow luminescence will display three individual colors when excited by electric fields of divergent frequencies.

5. The method of preparing a three-color field-responsive phosphor comprising zinc sulfide activated by copper and manganese and coactivated by chlorine: comprising admixing zinc sulfide and copper-containing compound and chloride, and excluding the chlorides of the group consisting of iron, cobalt, nickel and chromium chlorides; said admixture containing from 0.001 to 0.005 gram-atom of copper per mole of zinc sulfide, from 0.009 to 0.013 gram-atom of manganese per mole of zinc sulfide, and from 0.006 to 0.04 gram atom of chlorine per mole of zinc sulfide; firing said admixture at a temperature of from 800° C. to 1300° C. for at least about 15 minutes in an atmosphere which is substantially free from oxygen; alternately exposing said fired phosphor to relatively weak and to relatively strong 3650 A.U. excitations, some of said fired phosphor displaying a yellow luminescence when exposed to said relatively weak 3650 A.U. excitation, some of said fired phosphor displaying a blue-green luminescence when exposed to said relatively strong 3650 A.U. excitation; and separating that part of said fired phosphor which displays both yellow luminescence under said relatively-weak 3650 A.U. excitation and blue-green luminescence under said relatively-strong 3650 A.U. excitation from the phosphor residuum, whereby the separated phosphor which displays both said yellow and said blue-green luminescence will display three individual colors when excited by electric fields of divergent frequencies.

References Cited in the file of this patent

UNITED STATES PATENTS

| | | |
|---|---|---|
| 2,470,451 | Wood | May 17, 1949 |
| 2,743,238 | Hunt | Apr. 24, 1956 |
| 2,743,239 | Froelich | Apr. 24, 1956 |